(12) United States Patent
Ushida et al.

(10) Patent No.: US 12,176,771 B2
(45) Date of Patent: Dec. 24, 2024

(54) CONDUCTOR WIRE INSULATING FILM SEPARATING METHOD

(71) Applicants: AISIN CORPORATION, Aichi (JP); TOYOTA JIDOSHA KABUSHIKI KAISHA, Toyota (JP); DENSO CORPORATION, Kariya (JP)

(72) Inventors: Hideharu Ushida, Kariya (JP); Tetsuya Matsubara, Kariya (JP); Hiroyuki Ono, Kariya (JP); Toshiro Nakamura, Nisshin (JP); Yasuhiro Makido, Toyota (JP); Akihiro Ueda, Nisshin (JP); Ken Shirai, Toyota (JP); Ryosuke Maruyama, Kariya (JP)

(73) Assignees: AISIN CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 344 days.

(21) Appl. No.: 17/772,697

(22) PCT Filed: Jan. 28, 2021

(86) PCT No.: PCT/JP2021/003008
§ 371 (c)(1),
(2) Date: Apr. 28, 2022

(87) PCT Pub. No.: WO2021/153663
PCT Pub. Date: Aug. 5, 2021

(65) Prior Publication Data
US 2023/0006521 A1    Jan. 5, 2023

(30) Foreign Application Priority Data

Jan. 31, 2020  (JP) .................................. 2020-015515

(51) Int. Cl.
*H02K 3/12* (2006.01)
*H02K 3/34* (2006.01)
(Continued)

(52) U.S. Cl.
CPC ............... *H02K 15/04* (2013.01); *H02K 3/12* (2013.01); *H02K 3/34* (2013.01); *H02K 15/0068* (2013.01); *H02K 15/085* (2013.01)

(58) Field of Classification Search
CPC ........ H02K 3/04; H02K 15/0414; H02K 3/32; H02K 3/30; H02K 15/06; H02K 3/28;
(Continued)

(56) References Cited

U.S. PATENT DOCUMENTS

| 2018/0036836 A1* | 2/2018 | Nakamura ......... B23K 26/0736 |
| 2018/0166939 A1* | 6/2018 | Hirao ....................... H02K 3/04 |
| 2019/0280574 A1 | 9/2019 | Shirai et al. |

FOREIGN PATENT DOCUMENTS

| DE | 102017125887 A1 | 5/2019 |
| JP | H02-197206 A | 8/1990 |

(Continued)

OTHER PUBLICATIONS

Jun. 16, 2023 Extended European Search Report Issued in European Patent Application No. 21747625.8.
(Continued)

*Primary Examiner* — Leda T Pham
(74) *Attorney, Agent, or Firm* — Oliff PLC

(57) ABSTRACT

A conductor wire insulating film separating method disclosed includes: a preparing step involving preparing rectangular cross-section coil pieces each of which is a conductor wire coated with insulating film and used to provide a stator coil of rotary electric machine; a delivering-in step involving, after the preparing step, delivering coil pieces into a laser separator, with coil pieces aligned such that (Continued)

extremities thereof are adjacent to each other; an applying step involving, after the delivering-in step, continuously applying film removing laser to the extremities of the aligned coil pieces such that the laser is applied to one extremity and then to another extremity, thus removing at least portions of the insulating film from the extremities of the coil pieces; and a delivering-out step involving delivering the coil pieces, from which the at least portions of the insulating film have been removed by the applying step, out of the laser separator.

18 Claims, 17 Drawing Sheets

(51) Int. Cl.
*H02K 15/00* (2006.01)
*H02K 15/04* (2006.01)
*H02K 15/085* (2006.01)

(58) Field of Classification Search
CPC ............. H02K 15/0081; H02K 15/085; B23K 26/0736; B23K 26/22; B23K 26/0604; H01R 4/029; H01R 4/021
See application file for complete search history.

(56) References Cited

FOREIGN PATENT DOCUMENTS

| JP | 2012-000483 A | 1/2012 |
| JP | 2018-020340 A | 2/2018 |
| JP | 2018-098937 A | 6/2018 |
| JP | 2019-155375 A | 9/2019 |
| JP | 2019-201203 A | 11/2019 |

OTHER PUBLICATIONS

Apr. 6, 2021 Search Report issued in International Patent Application No. PCT/JP2021/003008.

* cited by examiner

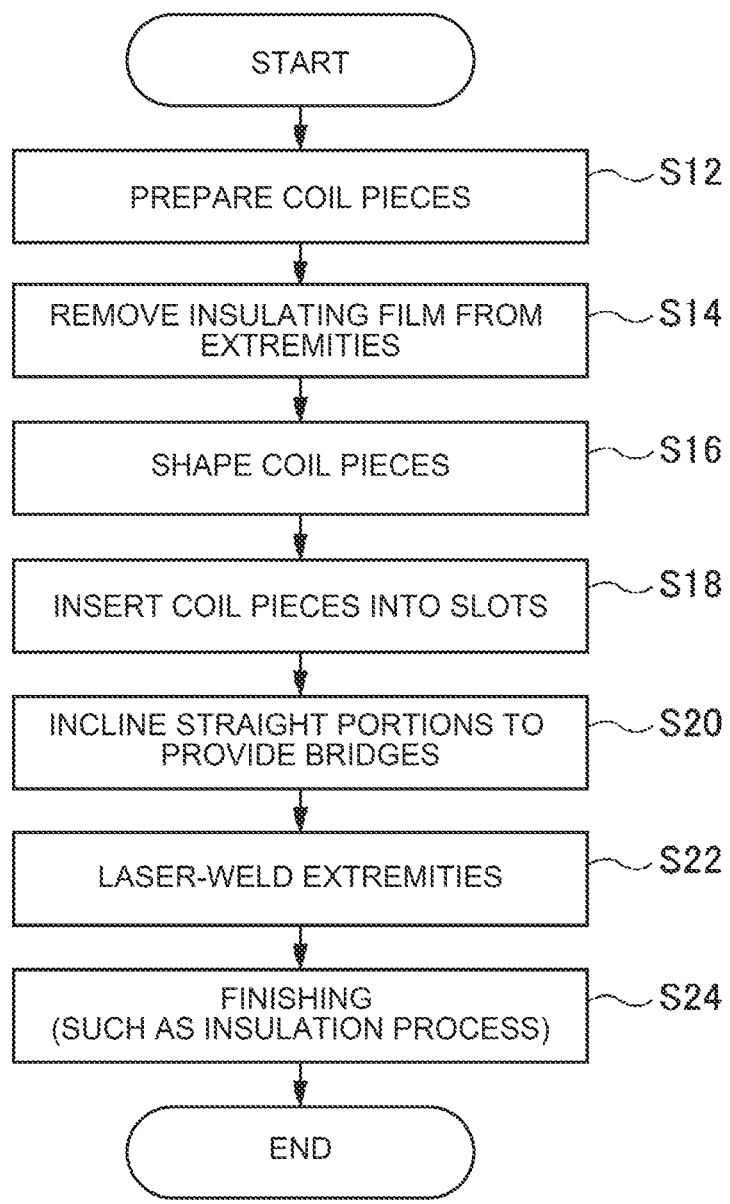

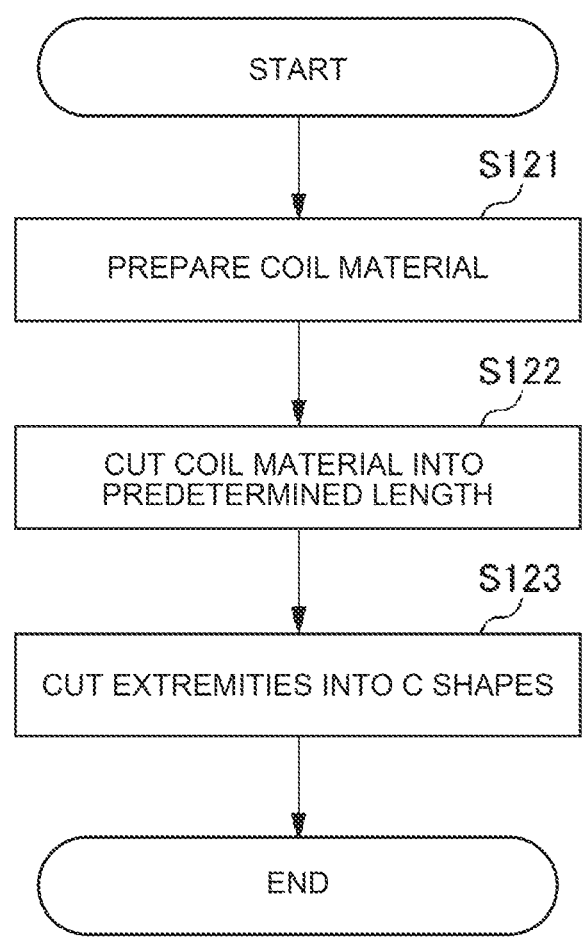

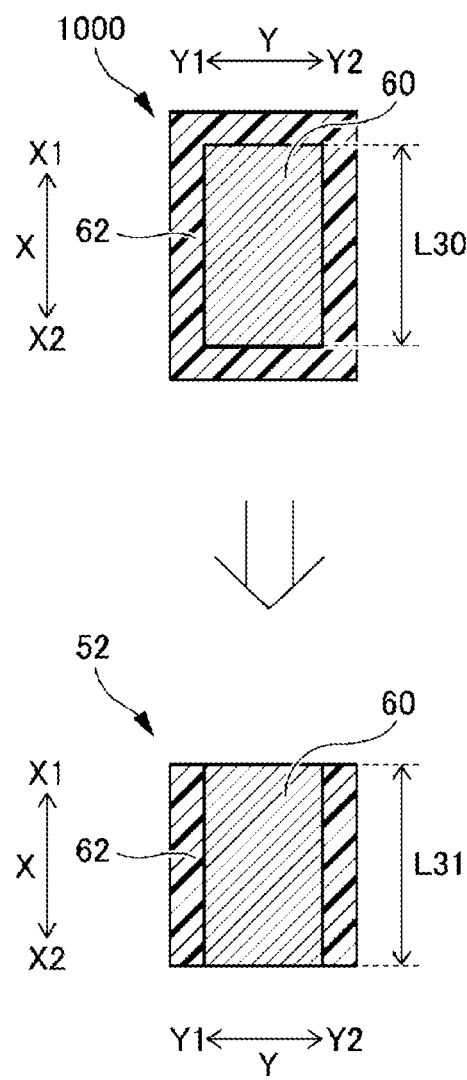

CONDUCTOR WIRE INSULATING FILM SEPARATING METHOD

TECHNICAL FIELD

The present disclosure relates to conductor wire insulating film separating methods.

BACKGROUND ART

A rectangular conductor wire insulating film separating method known in the related art involves applying laser light to an insulating film on a rectangular conductor wire so as to separate the insulating film therefrom (see, for example, Patent Document 1).

RELATED ART DOCUMENTS

Patent Documents

Patent Document 1: Japanese Unexamined Patent Application Publication No. 2012-70483 (JP 2012-70483 A)

SUMMARY OF THE DISCLOSURE

Problem to be Solved by the Disclosure

Unfortunately, the method known in the related art requires conveying coil pieces to a laser separator (or delivering the coil pieces into and out of the laser separator) on an individual basis. This disadvantageously results in reduced productivity.

Accordingly, an object of the present disclosure is to increase productivity by efficiently removing a coating (or an insulating film) from extremities of coil pieces.

Means for Solving the Problem

One aspect of the present disclosure provides a conductor wire insulating film separating method including:
- a preparing step involving preparing rectangular cross-section coil pieces each of which is a conductor wire coated with an insulating film and used to provide a stator coil of a rotary electric machine;
- a delivering-in step involving, after the preparing step, delivering the coil pieces into a laser separator, with the coil pieces in alignment with each other such that extremities of the coil pieces are adjacent to each other;
- an applying step involving, after the delivering-in step, continuously applying film removing laser to the extremities of the aligned coil pieces such that the laser is applied to one extremity and then to another extremity, thus removing at least portions of the insulating film from the extremities of the coil pieces; and
- a delivering-out step involving delivering the coil pieces, from which the at least portions of the insulating film have been removed by the applying step, out of the laser separator.

Effects of the Disclosure

The present disclosure is able to increase productivity by efficiently removing a coating (or an insulating film) from extremities of coil pieces.

BRIEF DESCRIPTION OF THE DRAWINGS

FIG. 9 is a flow chart schematically illustrating a stator manufacture procedure.

FIG. 10 is a flow chart schematically illustrating how a preparing step (S12 in FIG. 9) is to be performed.

FIG. 11B illustrates cross-sectional views taken along the line B1-B1 and the line B2-B2 in FIG. 11A.

MODES FOR CARRYING OUT THE DISCLOSURE

Embodiments of the present disclosure will be described in detail below with reference to the accompanying drawings. As used herein, the term "predetermined" refers to being specified in advance.

Figure 1:
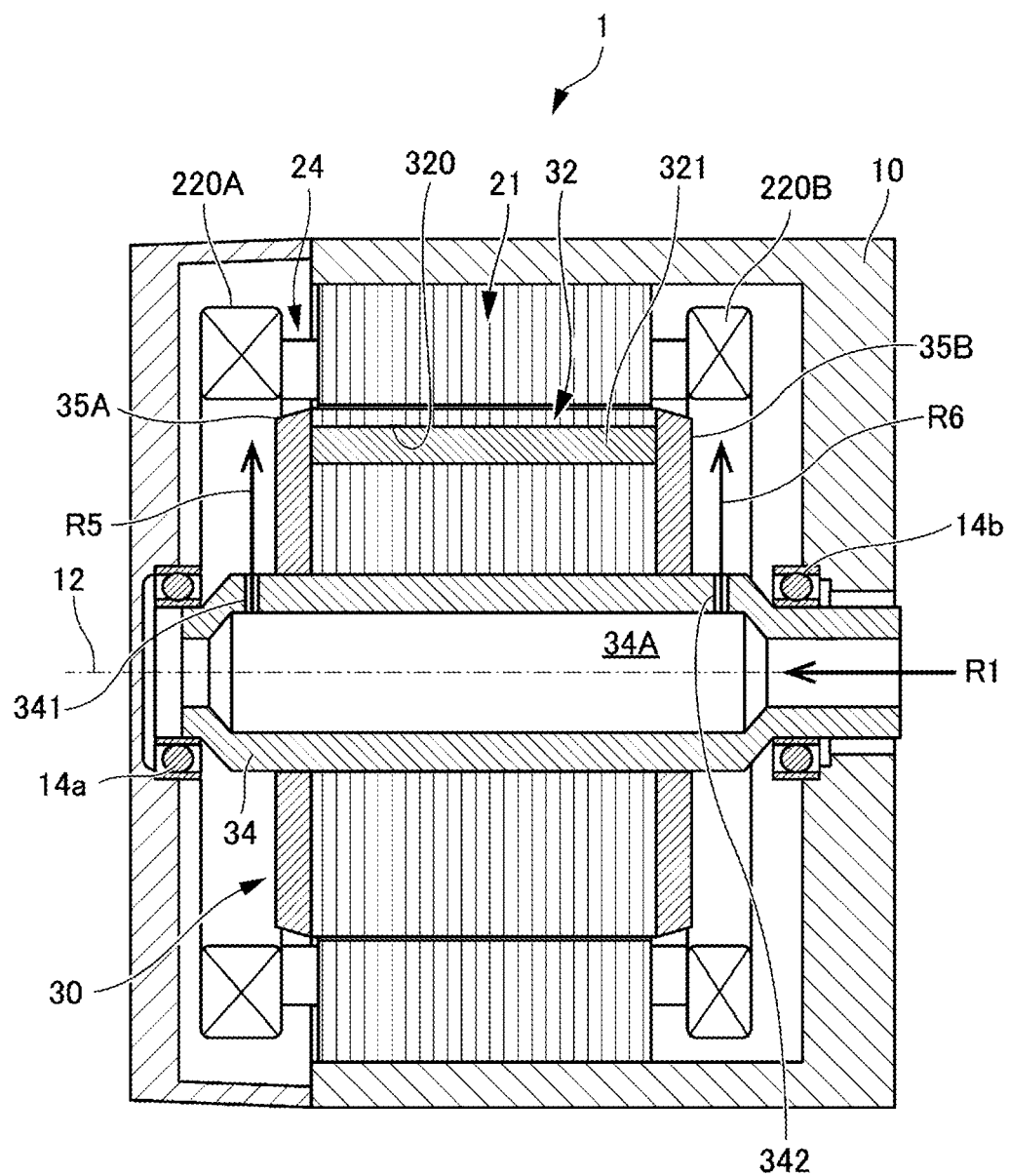
FIG. 1 is a schematic cross-sectional view of a cross-sectional structure of a motor according to one embodiment.

FIG. 1 is a schematic cross-sectional view of a cross-sectional structure of a motor 1 (which is an exemplary rotary electric machine) according to one embodiment.

FIG. 1 illustrates a rotation axis 12 of the motor 1. In the following description, the term "axial direction" refers to a direction in which the rotation axis (center of rotation) 12 of the motor 1 extends, and the term "radial direction" refers to a radial direction with respect to the rotation axis 12. Accordingly, the term "radially outward" refers to a direction away from the rotation axis 12, and the term "radially inward" refers to a direction toward the rotation axis 12. The term "circumferential direction" corresponds to a direction of rotation around the rotation axis 12.

The motor 1 may be a vehicle driving motor to be used in, for example, a hybrid vehicle or an electric vehicle. Alternatively, the motor 1 may be used for any other purposes.

The motor 1 is of an inner rotor type in which a stator 21 is provided such that the stator 21 surrounds the radially outward portion of a rotor 30. The radially outward portion of the stator 21 is secured to a motor housing 10.

The rotor 30 is disposed radially inward of the stator 21. The rotor 30 includes a rotor core 32 and a rotor shaft 34. The rotor core 32 is secured to the radially outward portion of the rotor shaft 34 such that the rotor core 32 rotates together with the rotor shaft 34. The rotor shaft 34 is rotatably supported by the motor housing 10 through bearings 14a and 14b. The rotor shaft 34 defines the rotation axis 12 of the motor 1.

The rotor core 32 includes, for example, annular magnetic steel sheets stacked on top of another. Permanent magnet(s) 321 is/are inserted into the rotor core 32. Any number of permanent magnets 321 may be inserted into the rotor core 32. The permanent magnet(s) 321 may be arranged in any manner. In one variation, the rotor core 32 may be made of a green compact provided by compressing magnetic powder.

End plates 35A and 35B are attached to the axial ends of the rotor core 32. The end plates 35A and 35B may have not only the function of supporting the rotor core 32 but also the function of balancing the rotor 30 (e.g., the function of correcting imbalance by being cut).

As illustrated in FIG. 1, the rotor shaft 34 includes a hollow portion 34A. The hollow portion 34A extends along the entire axial length of the rotor shaft 34. The hollow portion 34A may function as an oil passage. In one example, oil is supplied to the hollow portion 34A through its first axial end as indicated by the arrow R1 in FIG. 1 and then flows along the radially inward surface of the rotor shaft 34. The oil is thus able to cool the rotor core 32 from a region radially inward of the rotor core 32. The oil flowing along the radially inward surface of the rotor shaft 34 may be ejected radially outward (as indicated by the arrows R5 and R6) through oil holes 341 and 342 defined in the ends of the rotor shaft 34, and may thus serve to cool coil ends 220A and 220B.

Although FIG. 1 illustrates the motor 1 having a particular structure, the motor 1 may have any structure as long as the motor 1 includes stator coils 24 (which will be described below) connected by welding. One example may thus involve providing the rotor shaft 34 including no hollow portion 34A, or the rotor shaft 34 including a hollow portion significantly smaller in inside diameter than the hollow portion 34A. Although FIG. 1 discloses a particular cooling method, the motor 1 may be cooled by any method. Accordingly, one example may involve providing oil introduction tube(s) inserted into the hollow portion 34A, or dropping oil to the coil ends 220A and 220B from region(s) radially outward of the coil ends 220A and 220B through oil passage (s) defined in the motor housing 10.

Although FIG. 1 illustrates the inner rotor type motor 1 whose rotor 30 is disposed inward of the stator 21, the present disclosure may be applied to any other type of motor. The present disclosure may be applied to, for example, an outer rotor type motor whose rotor 30 is disposed outward of the stator 21 such that the rotor 30 is concentric with the stator 21, or a dual rotor type motor whose rotors 30 are disposed outward and inward of the stator 21.

A structure of the stator 21 will now be described in detail with reference to FIG. 2 and the subsequent diagrams.

Figure 2:
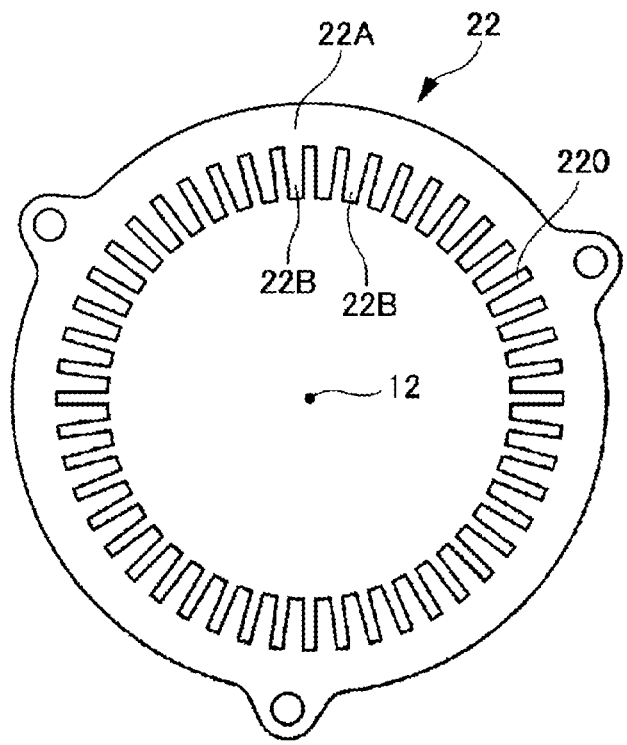
FIG. 2 is a plan view of a stator core illustrated in isolation.
Figure 3:
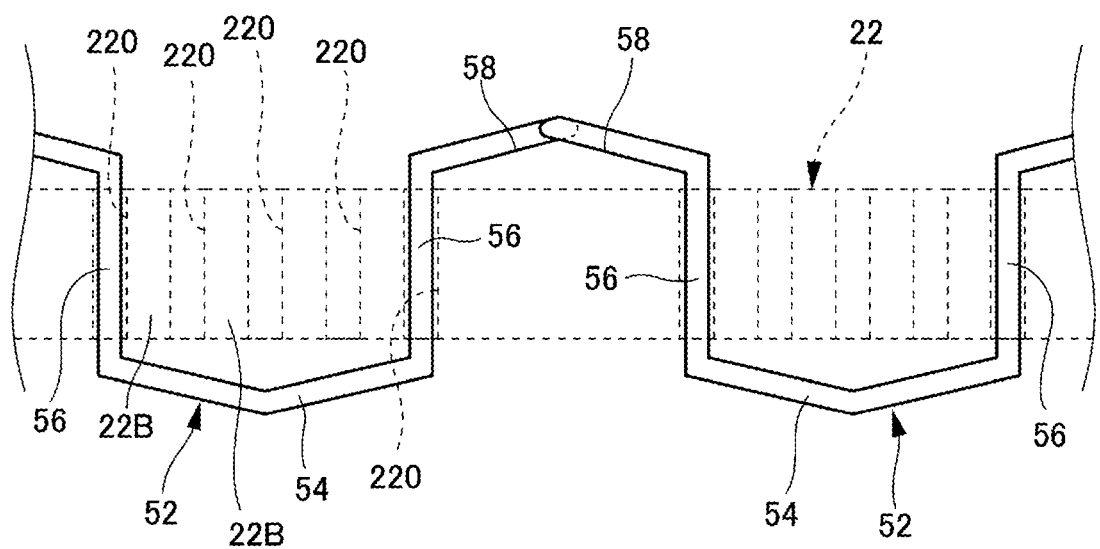
FIG. 3 is a diagram schematically illustrating a pair of coil pieces assembled to the stator core.
Figure 4:
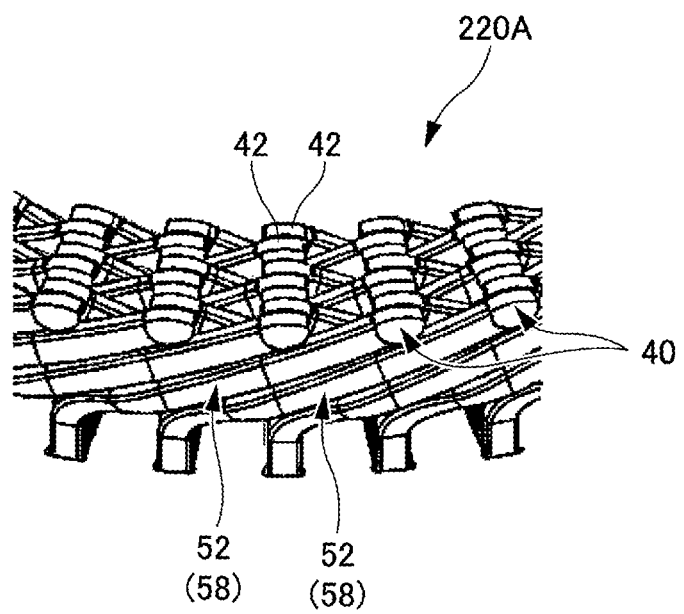
FIG. 4 is a perspective view of a portion of a stator adjacent to a coil end.
Figure 5:
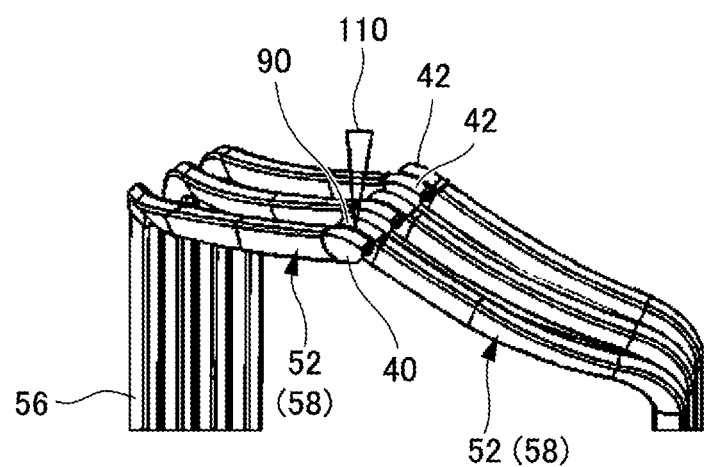
FIG. 5 is a perspective view of selected ones of in-phase coil pieces.

FIG. 2 is a plan view of a stator core 22 illustrated in isolation. FIG. 3 is a diagram schematically illustrating a pair of coil pieces 52 assembled to the stator core 22. FIG. 3 illustrates a relationship between the pair of coil pieces 52 and slots 220, with the radially inward portion of the stator core 22 spread out. In FIG. 3, the stator core 22 is indicated by the dotted lines, and some of the slots 220 are not illustrated. FIG. 4 is a perspective view of a portion of the stator 21 adjacent to the coil end 220A. FIG. 5 is a perspective view of selected ones of in-phase coil pieces 52.

The stator 21 includes the stator core 22 and the stator coils 24.

The stator core 22 includes, for example, annular magnetic steel sheets stacked on top of another. In one variation, the stator core 22 may be made of a green compact provided by compressing magnetic powder. The stator core 22 may include divided cores divided in the circumferential direction or may be undivided in the circumferential direction. The radially inward portion of the stator core 22 is provided with the slots 220 through which the stator coils 24 are to be wound. Specifically, as illustrated in FIG. 2, the stator core 22 includes an annular back yoke 22A and teeth 22B extending radially inward from the back yoke 22A. The slots 220 are each defined between the associated teeth 22B in the circumferential direction. The stator core 22 may be provided with any number of slots 220. By way of example, the number of slots 220 is 48 in the present embodiment.

The stator coils 24 include a U phase coil, a V phase coil, and a W phase coil (which will hereinafter be referred to as a "phase coil" when no distinction is made between U, V, and W phases). A base end of each phase coil is connected to an input terminal (not illustrated). A tail end of each phase coil is connected to a tail end of another phase coil so as to define a neutral point of the motor 1. In other words, the stator coils 24 are arranged in a star connection. The mode of connection of the stator coils 24 may be changed as appropriate in accordance with, for example, motor characteristics required. In one example, the stator coils 24 may be arranged in a delta connection instead of a star connection.

Figure 6:
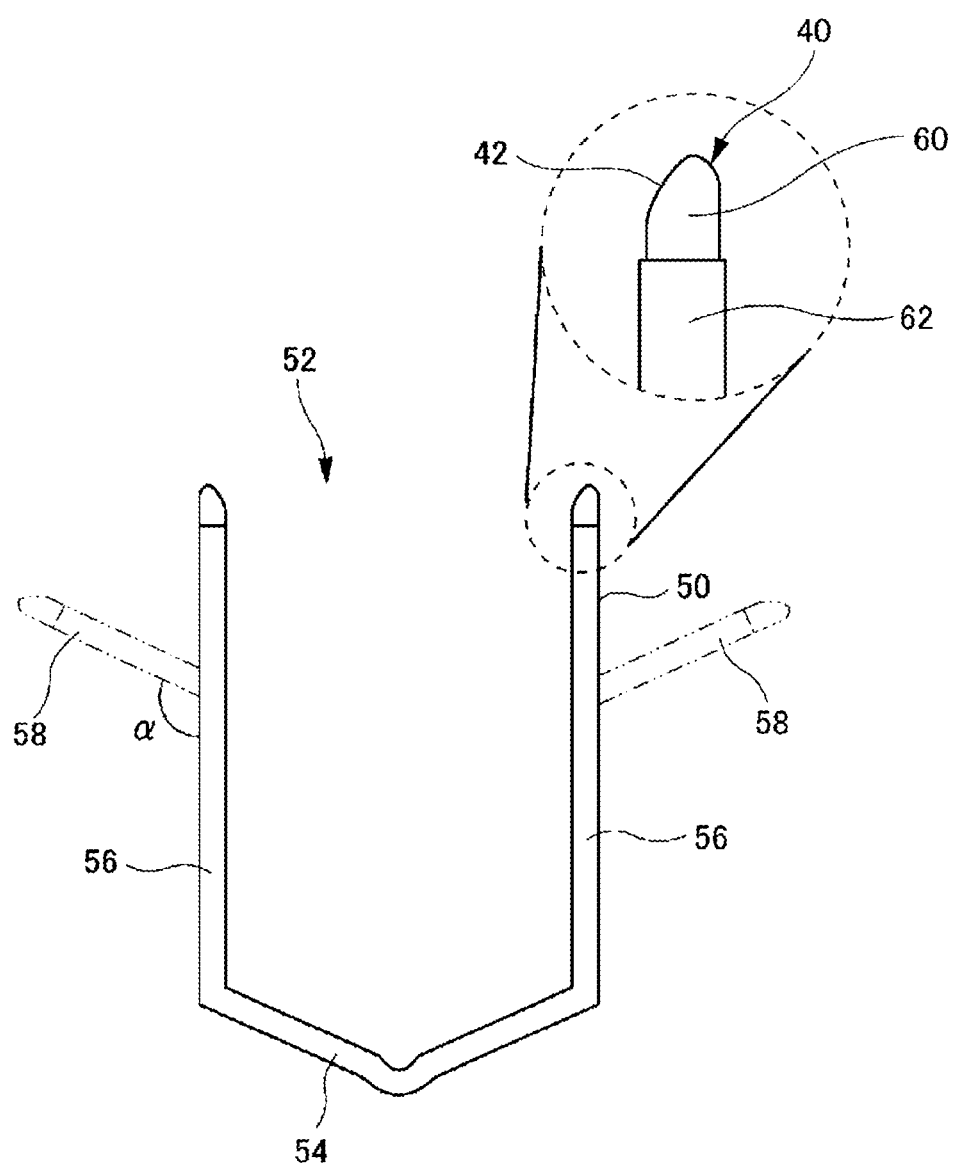
FIG. 6 is a schematic front view of one coil piece.

Each phase coil is provided by connecting the coil pieces 52. FIG. 6 is a schematic front view of one coil piece 52. The coil pieces 52 are in the form of segment coils divided in units by which the phase coils are easily assembled to the stator core 22 (e.g., in units by which each phase coil is inserted into the associated two slots 220). Each coil piece 52 includes a substantially rectangular cross-section linear conductor (or a rectangular cross-section rectangular wire) 60 coated with an insulating coating 62 (which is an exemplary coating). By way of example, the linear conductor 60 is made of copper in the present embodiment. In one variation, the linear conductor 60 may be made of other conductive material, such as iron.

Before being assembled to the stator core 22, the coil pieces 52 may be substantially U-shaped such that the coil pieces 52 each include a pair of straight portions 50 and a connector 54 connecting the pair of straight portions 50. Assembling the coil pieces 52 to the stator core 22 involves inserting each pair of straight portions 50 into the associated slots 220 (see FIG. 3). As illustrated in FIG. 3, each connector 54 thus extends in the circumferential direction such that each connector 54 straddles the teeth 22B (and the associated slots 220) at a location adjacent to a second axial end of the stator core 22. Each connector 54 may straddle any number of slots 220. In FIG. 3, each connector 54 straddles three slots 220. After insertion of the straight portions 50 into the slots 220, each straight portion 50 is bent at a point somewhere along its length such that the bent part extends in the circumferential direction as indicated by the chain double dashed-lines in FIG. 6. Accordingly, each straight portion 50 is divided into: a leg 56 extending in the axial direction within the associated slot 220; and a bridge 58 extending in the circumferential direction at a location adjacent to a first axial end of the stator core 22.

In FIG. 6, the pair of straight portions 50 is bent in directions away from each other. The pair of straight portions 50 may be bent in any other directions. In one example, the pair of straight portions 50 may be bent in directions toward each other. The stator coils 24 may further include, for example, neutral point coil pieces for connecting the tail ends of the three-phase phase coils to each other so as to provide neutral points.

The legs 56 of the associated coil pieces 52, one of which is illustrated in FIG. 6, are inserted into an associated one of the slots 220 such that the legs 56 are side by side in the radial direction. Accordingly, the bridges 58 extending in the circumferential direction are side by side in the radial direction at a location adjacent to the first axial end of the stator core 22. As illustrated in FIGS. 3 and 5, the bridge 58 of a first one of the coil pieces 52, which protrudes from a first one of the slots 220 and extends to a first circumferential side (e.g., in a clockwise direction), is connected to the bridge 58 of a second one of the coil pieces 52, which protrudes from a second one of the slots 220 and extends to a second circumferential side (e.g., in a counterclockwise direction).

By way of example, six coil pieces 52 are assembled to each slot 220 in the present embodiment. The radially outermost coil piece 52 may hereinafter be referred to as a "first-turn coil piece 52", the second radially outermost coil piece 52 may hereinafter be referred to as a "second-turn coil piece 52", and the third radially outermost coil piece 52 may hereinafter be referred to as a "third-turn coil piece 52". In this case, extremities 40 of the first-turn coil piece 52 and the second-turn coil piece 52 are connected to each other by a connecting step (which will be described below), extremities 40 of the third-turn coil piece 52 and a fourth-turn coil piece 52 are connected to each other by the connecting step (which will be described below), and extremities 40 of a fifth-turn coil piece 52 and a sixth-turn coil piece 52 are connected to each other by the connecting step (which will be described below).

Although the coil pieces 52 are coated with the insulating coating 62 as previously mentioned, only the extremities 40 have the insulating coating 62 removed therefrom. This is because electric connections need to be made between the different coil pieces 52 through the extremities 40. As illustrated in FIGS. 5 and 6, axially outward end faces 42 of the extremities 40 of the coil pieces 52 (i.e., first widthwise end faces of the coil pieces 52) are finally formed into arc-shaped surfaces protruding axially outward. Accordingly, only the extremities 40 of the coil pieces 52 are C-shaped such that the extremities 40 are asymmetric with respect to the widthwise center of the coil pieces 52.

Figure 7:
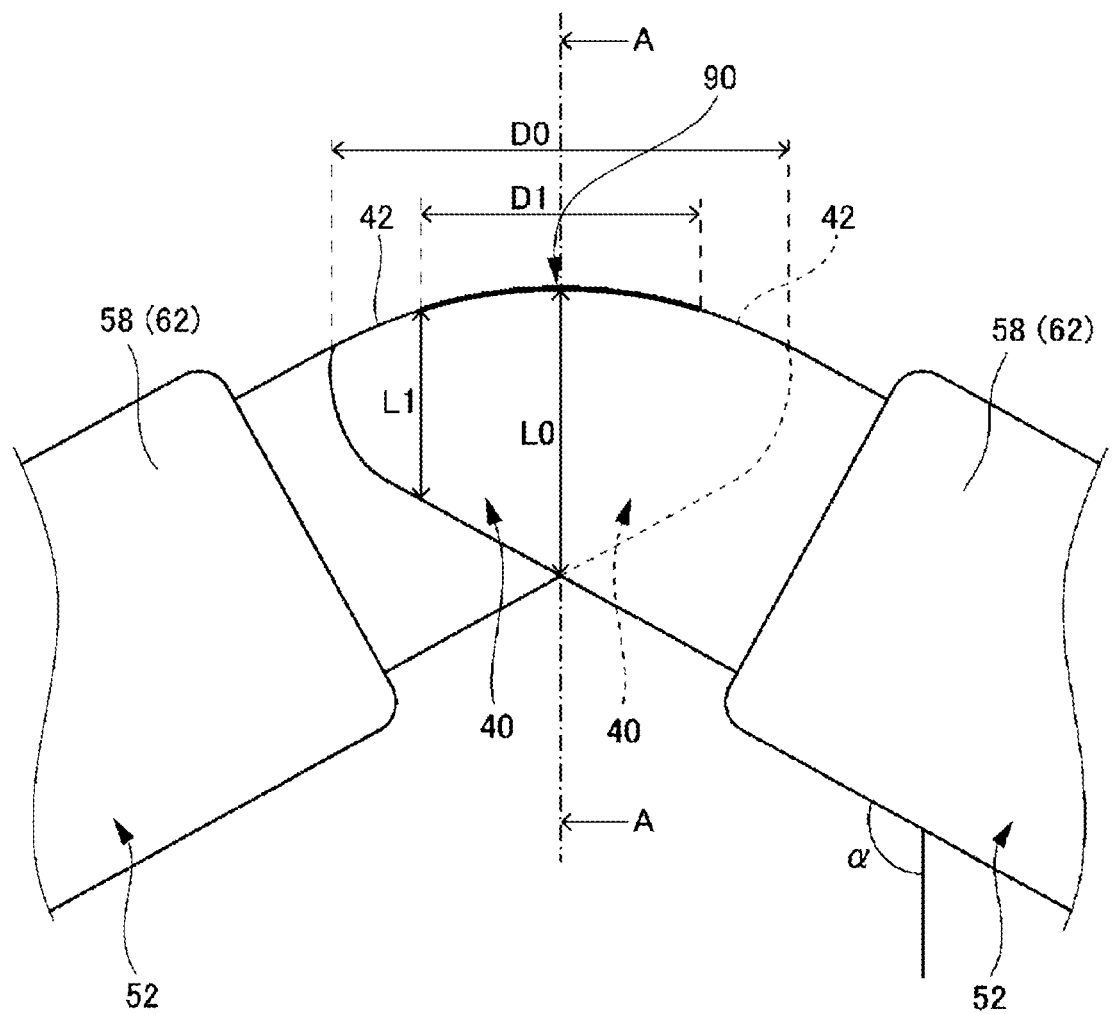
FIG. 7 is a diagram illustrating extremities of coil pieces connected to each other and portions of the coil pieces adjacent to the extremities.
Figure 8:
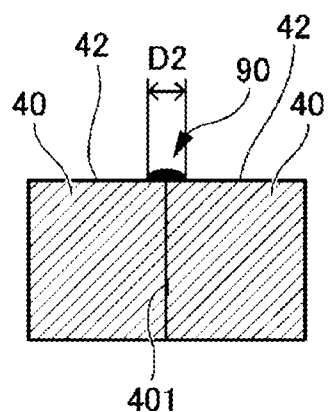
FIG. 8 is a cross-sectional view taken along the line A-A in FIG. 7, which passes through a welding target location.

FIG. 7 is a diagram illustrating the extremities 40 of the coil pieces 52 connected to each other and portions of the coil pieces 52 adjacent to the extremities 40. FIG. 7 schematically illustrates a circumferential range D1 of a welding target location 90. FIG. 8 is a cross-sectional view taken along the line A-A in FIG. 7, which passes through the welding target location 90.

Connection of the extremities 40 of the coil pieces 52 may involve connecting the two extremities 40, which are to be connected to each other, by overlapping the extremities 40 in their thickness direction such that central axes O of the arc-shaped surfaces (i.e., the axially outward end faces 42) of the extremities 40 correspond to each other. Overlapping the extremities 40 such that the central axes O correspond to each other in this manner would enable the axially outward lines of the two extremities 40, which are to be connected to each other, to correspond to each other, and would enable the extremities 40 to be suitably overlapped with each other, if a bent angle α is relatively large or small.

In the present embodiment, a connecting method for connecting the extremities 40 of the coil pieces 52 involves performing welding. In the present embodiment, the connecting method involves performing laser welding using a laser beam source as a heat source, instead of performing arc welding, typified by TIG welding. Performing laser welding instead of TIG welding enables a reduction in the axial lengths of the coil ends 220A and 220B. TIG welding requires axially outwardly bending the extremities of the coil pieces (which are brought into abutment with each other) such that the extremities extend in the axial direction. In contrast, laser welding does not require such bending and is thus performable, with the extremities 40 of the coil pieces 52 (which are brought into abutment with each other) extending in the circumferential direction as illustrated in FIG. 7. This enables the axial lengths of the coil ends 220A and 220B to be shorter than when the extremities 40 of the coil pieces 52 (which are brought into abutment with each other) are bent axially outward such that the extremities 40 extend in the axial direction.

As schematically illustrated in FIG. 5, laser welding involves applying a welding laser beam 110 to the welding target location 90 on the two extremities 40 in abutment with each other. The direction of application (or the direction of propagation) of the laser beam 110 is substantially parallel to the axial direction, and corresponds to an axially inward direction toward the axially outward end faces 42 of the two extremities 40 in abutment with each other. Laser welding enables local heating, thus making it possible to heat only the extremities 40 and regions adjacent thereto and effectively reduce damage to the insulating coating 62 (such as carbonization). Consequently, the present embodiment is able to make electric connections between the coil pieces 52 while maintaining suitable insulation performance.

As illustrated in FIG. 7, the circumferential range D1 of the welding target location 90 is a portion of an overall circumferential range D0 extending across the axially outward end faces 42 of abutting regions of the extremities 40 of the two coil pieces 52 other than the ends of the overall circumferential range D0. This is because the axially outward end faces 42 that are convexly arc-shaped surfaces make it difficult for a welding depth (see a dimension L1 in FIG. 7) to be sufficient at the ends of the overall circumferential range D0. The circumferential range D1 of the welding target location 90 may be adjusted so as to provide a necessary connecting area between the coil pieces 52 and necessary welding strength, for example.

As illustrated in FIG. 8, the center of a radial range D2 of the welding target location 90 is defined by an abutment plane 401 between the extremities 40 of the two coil pieces 52. The radial range D2 of the welding target location 90 may correspond to a diameter (or beam diameter) of the laser beam 110. Specifically, the laser beam 110 is applied in such a manner as to cause an application position to change linearly in the circumferential direction without changing substantially in the radial direction.

Referring now to FIG. 9, a procedure of manufacture of the stator 21 will be outlined. FIG. 9 is a flow chart schematically illustrating the procedure of manufacture of the stator 21.

A method for manufacturing the stator 21 includes a preparing step (S12) involving making the coil pieces 52 out of a long straight coil material (which is a coil material before being shaped) so as to provide the stator coils 24. The preparing step will be described in detail below. The coil pieces 52 made in the preparing step are each in a straight state. The long straight coil material provided in the preparing step is entirely coated with the insulating coating 62.

The method for manufacturing the stator 21 further includes a coating removing step (S14) involving removing the insulating coating 62 from the extremities 40 (starting and finishing ends) of the coil pieces 52. In the present embodiment, the insulating coating 62 is removed with coating removing laser. Any type of coating removing laser (e.g., coating removing laser of any wavelength) may be used. Examples of the coating removing laser include infra-red laser and green laser. The coating removing step will be described in detail below.

The method for manufacturing the stator 21 further includes a shaping step (S16) involving, after the coating removing step, bending the straight coil pieces 52 using, for example, a mold so as to shape the coil pieces 52. In one example, the coil pieces 52 are substantially U-shaped such that the coil pieces 52 each include the pair of straight portions 50 and the connector 54 connecting the pair of straight portions 50 as illustrated in FIG. 6.

The method for manufacturing the stator 21 further includes an inserting step (S18) involving inserting the coil pieces 52 into the slots 220 of the stator core 22 after the shaping step. The inserting step is finished upon completion of insertion of all the coil pieces 52.

The method for manufacturing the stator 21 further includes a deforming step (S20) involving, after the inserting step, causing parts of the straight portions 50 projecting from the slots 220 to incline in the circumferential direction using a dedicated jig. Each straight portion 50 is thus divided into: the leg 56 extending in the axial direction within the associated slot 220; and the bridge 58 extending in the circumferential direction at a location adjacent to the first axial end of the stator core 22.

The method for manufacturing the stator 21 further includes a connecting step (S22) involving, after the deforming step, making a connection between the extremity 40 of the bridge 58 of the first one of the coil pieces 52 extending to the first circumferential side (e.g., in the clockwise direction) and the extremity 40 of the bridge 58 of the second one of the coil pieces 52 extending to the second circumferential side (e.g., in the counterclockwise direction). In the present embodiment, the two extremities 40 are welded (or connected) by applying, for example, green laser thereto by pulse oscillation. Welding is performed for every two extremities 40. The connecting step ends when the two extremities 40 in every group have been welded.

The method for manufacturing the stator 21 further includes a finishing step (S24) to be performed after the connecting step. The finishing step may include, for example, the step of performing an insulation process on the coil ends 220A and 220B provided by assembling the coil pieces 52 to the stator core 22 as mentioned above. The insulation process may involve resin-molding the coil ends 220A and 220B such that the coil ends 220A and 220B are entirely sealed, or may involve applying, for example, varnish to the coil ends 220A and 220B.

Referring now to FIG. 10 and the subsequent diagrams, the preparing step (S12 in FIG. 9) and the coating removing step (S14 in FIG. 9), which have been mentioned above, will be described in more detail. The steps described below may be performed manually by an operator (or person), may all be performed automatically by a robot, for example, or may be performed by a combination of such manual and automatic operations.

FIG. 10 is a flow chart schematically illustrating how the preparing step (S12 in FIG. 9), which has been mentioned above, is to be performed.

First, the preparing step includes the step (S121) of preparing a straight coil material (or a coil material before being shaped).

The preparing step further includes the step (S122) of cutting the coil material into a predetermined length suitable for providing one or more coil pieces 52. In this step, a plurality of predetermined-length coil materials may be provided simultaneously. The predetermined length may correspond to the length of one coil piece 52. By way of example, the predetermined length corresponds to the length of a plurality of the coil pieces 52 in the present embodiment. The plurality of predetermined-length coil materials may be subjected to pretreatment before the subsequent cutting step.

The preparing step further includes the cutting step (S123) of cutting the predetermined-length coil material into a plurality of coil pieces 52. Specifically, the cutting step (S123) involves cutting portions of the predetermined-length coil material, which will be the extremities of the coil pieces 52, into C shapes using a press (not illustrated), thus providing the coil pieces 52 including the extremities 40 mentioned above. The coil pieces 52 provided in this cutting step are the straight coil pieces 52 before being shaped, with portions of the insulating coating 62 not removed from the extremities 40.

Figure 11A:
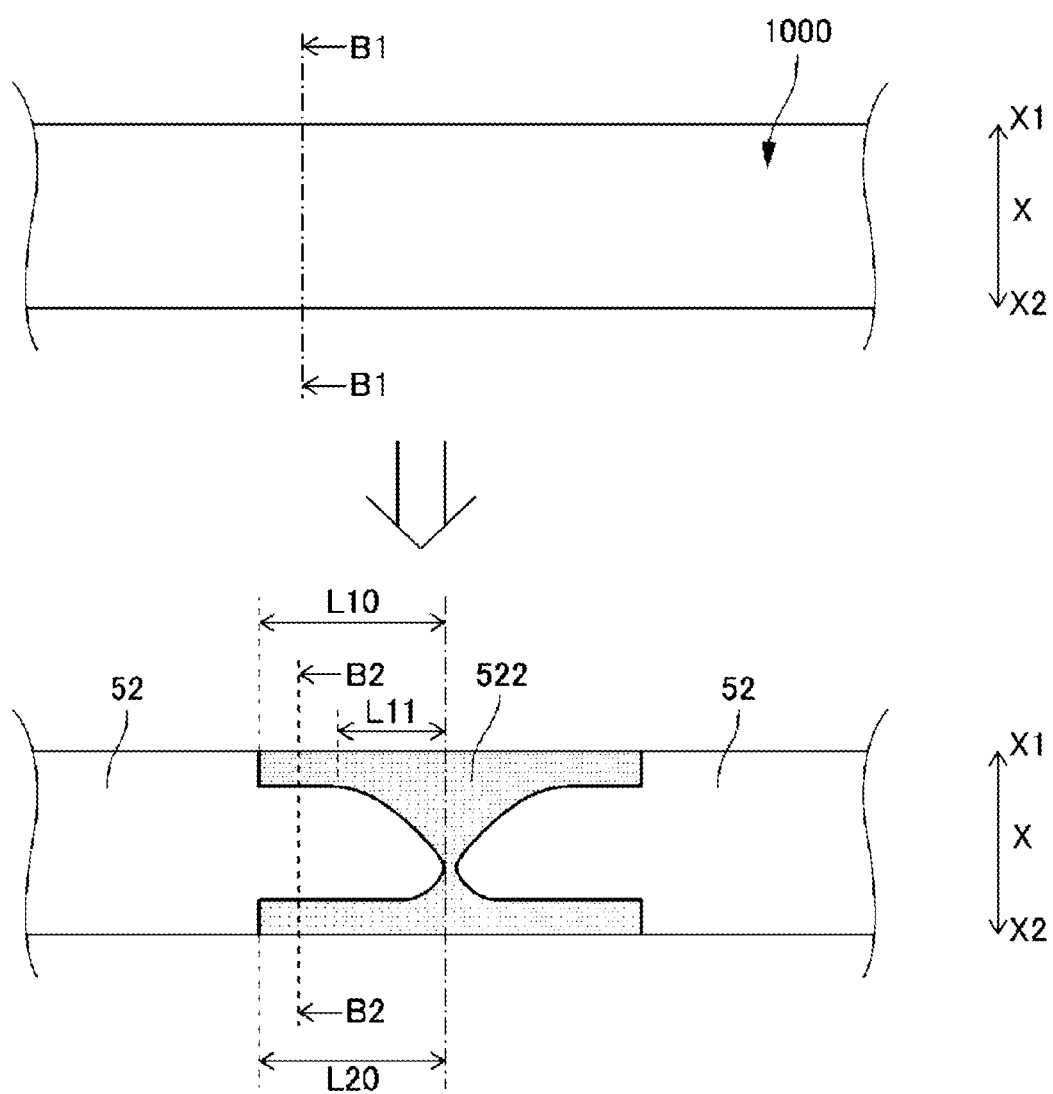
FIG. 11A illustrates diagrams describing a cutting step (S123 in FIG. 10) in Embodiment 1.

FIG. 11A illustrates diagrams describing the cutting step (S123). FIG. 11A schematically illustrates how two coil pieces 52 are made out of a single coil material 1000. The upper diagram of FIG. 11A illustrates a state before the cutting step. The lower diagram of FIG. 11A illustrates a state after the cutting step. FIG. 11B illustrates cross-sectional views taken along the line B1-B1 and the line B2-B2 in FIG. 11A. In FIGS. 11A and 11B, an X direction and X1 and X2 sides in the X direction (i.e., the widthwise direction of each coil piece 52) are defined for the sake of description. The X1 side is an example of a first widthwise side. The X2 side is an example of a second widthwise side. The X1 side corresponds to a region adjacent to the axially outward end faces 42 of the C-shaped extremities 40. In FIG. 11B, a Y direction corresponding to the thickness direction of each coil piece 52, and Y1 and Y2 sides in the X direction (i.e., the widthwise direction of each coil piece 52) are defined. The Y direction corresponds to the direction of the short sides of the linear conductor (or rectangular wire) 60 of each coil piece 52 in cross section.

The term "widthwise direction of each coil piece 52" hereinafter refers to a direction along the long sides of the rectangular wire of the linear conductor (or rectangular wire) 60 of each coil piece 52 in cross section. Lateral faces of each coil piece 52 are surfaces of each coil piece 52 extending in the thickness direction (i.e., the Y direction). The term "lateral faces of each coil piece 52" refers to surfaces of each coil piece 52 adjacent to short-side surfaces of the linear conductor (or rectangular wire) 60 in cross section. The lateral faces of each coil piece 52 include a surface facing to the X1 side, a surface facing to the X2 side, and a surface (or end face) facing in the lengthwise direction of the extremity 40.

In the present embodiment, the cutting step is performed in such a manner as to simultaneously remove the insulating coating 62 from the lateral faces of portions of the coil pieces 52 adjacent to the extremities 40. Specifically, as illustrated in FIGS. 11A and 11B, providing the extremities 40 involves using the press so as to remove, from the X1 side lateral faces, portions of the insulating coating 62 extending over a first distance L10 from tips of the coil pieces 52, and remove, from the X2 side lateral faces, portions of the insulating coating 62 extending over a second distance L20 from the tips of the coil pieces 52. When the extremities 40 are formed into C shapes, this process makes it possible to simultaneously remove, from the X1 side lateral faces, the portions of the insulating coating 62 extending over the first distance L10 and remove, from the X2 side lateral faces, the portions of the insulating coating 62 extending over the second distance L20. Such removal reduces the necessity of an additional process, such as notching the coating in advance before the coating removing step. The coating on the extremities 40 of the coil pieces 52 is thus more efficiently removable. In FIG. 11A, portions of the coil material 1000 to be removed in the cutting step are indicated by a hatched area 522. Accordingly, the coil pieces 52 are provided by the cutting step such that portions of the insulating coating 62 corresponding to the hatched area 522 are removed from the lateral faces. The coil pieces 52 are thus provided by the cutting step such that portions of the linear conductor 60 on the X1 side are exposed over the first distance L10 from the tips of the coil pieces 52, and portions of the linear conductor 60 on the X2 side are exposed over the second distance L20 from the tips of the coil pieces 52. Because the extremities 40 are C-shaped, end faces of the linear conductor 60 in the lengthwise direction are included in the X1 side or X2 side lateral faces and are similarly exposed. The press may cut X1 side portions of the linear conductor 60 in removing, from the X1 side lateral faces, the portions of the insulating coating 62 extending over the first distance L10 from the tips of the coil pieces 52. Similarly, the press may cut X2 side portions of the linear conductor 60 in removing, from the X2 side lateral faces, the portions of the insulating coating 62 extending over the second distance L20 from the tips of the coil pieces 52. This makes it possible to reliably remove targeted portions of the insulating coating 62 during this cutting step. In this case, the widthwise dimension of the linear conductor 60 decreases from a pre-cutting dimension L30 (see the upper diagram of FIG. 11B) to a post-cutting dimension L31 (see the lower diagram of FIG. 11B).

The first distance L10 and the second distance L20 are each preferably equal to or longer than a coating removing laser application range (which will be described below) such that the lateral faces of the linear conductor 60 are exposed at least in an area corresponding to the welding target location 90. The coating removing laser application range is indicated by L41 and L42 in FIG. 16 (which will be described below). In this case, the first distance L10 and the second distance L20 are each set to be significantly longer than a distance L11 between the tip of each coil piece 52 and a starting position (or X1 side starting position) of each C shape. By way of example, the first distance L10 and the second distance L20 are equal to each other in the present embodiment. Alternatively, the first distance L10 and the second distance L20 may be different from each other.

By way of example, the present embodiment involves providing the C-shaped extremities concurrently with the process of cutting the coil material 1000, which is long enough for a plurality of the coil pieces 52, into a plurality of the coil pieces 52 as illustrated in FIGS. 11A and 11B. The present disclosure, however, is not limited to this example. In another example, the coil material 1000 long enough for a plurality of the coil pieces 52 may be cut into a plurality of coil materials, and then portions of the coil materials, which will be the extremities 40 of the coil pieces 52, may be cut into C shapes by a press (not illustrated) on an individual basis so as to provide the coil pieces 52 including the extremities 40 described above.

The C-shaped extremities may be simultaneously provided on both sides of each of the coil pieces 52 in the lengthwise direction, or the C-shaped extremity may be sequentially provided on one side of each of the coil pieces 52 in the lengthwise direction.

Figure 12:
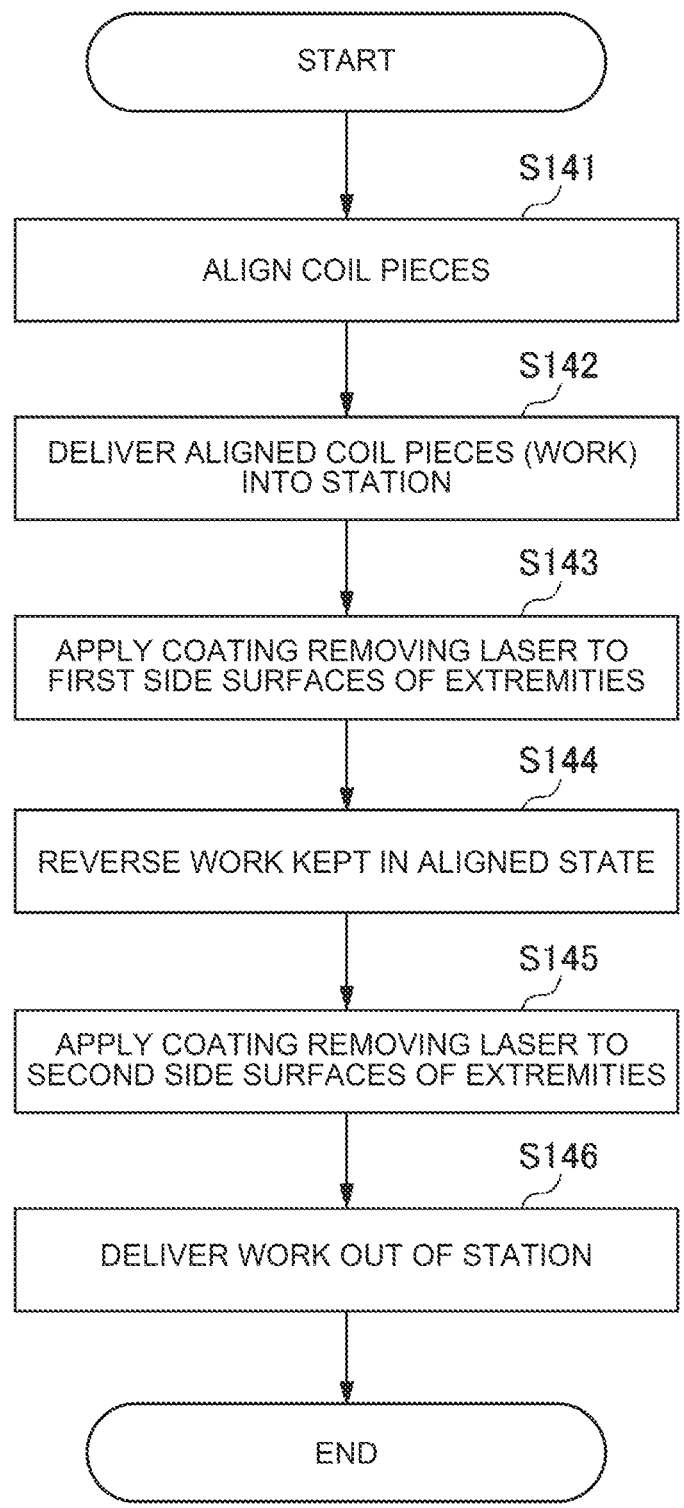
FIG. 12 is a flow chart schematically illustrating how a coating removing step (S14 in FIG. 9) is to be performed.
Figure 13:
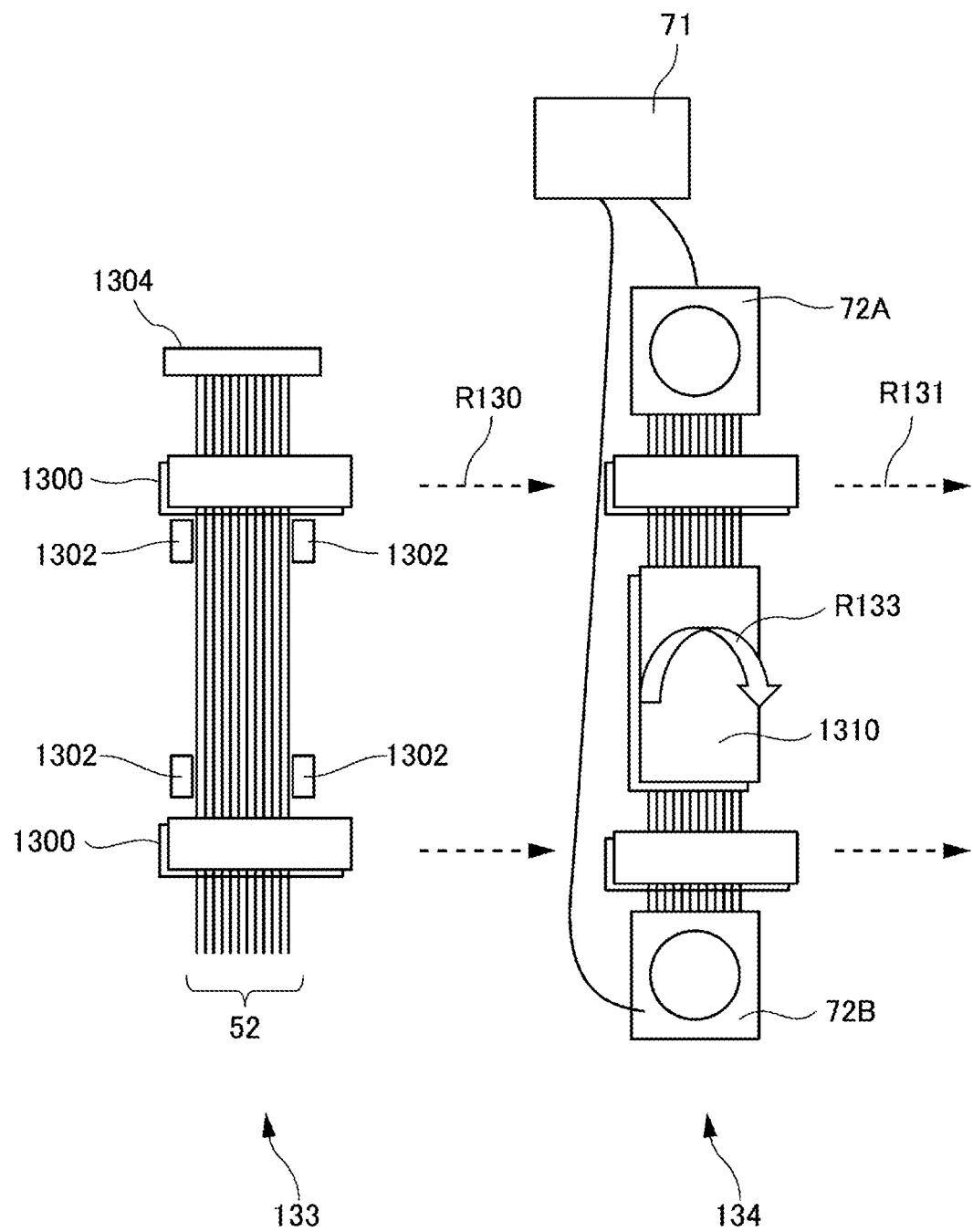
FIG. 13 is a top view schematically describing how the coating removing step is to be performed.
Figure 14:
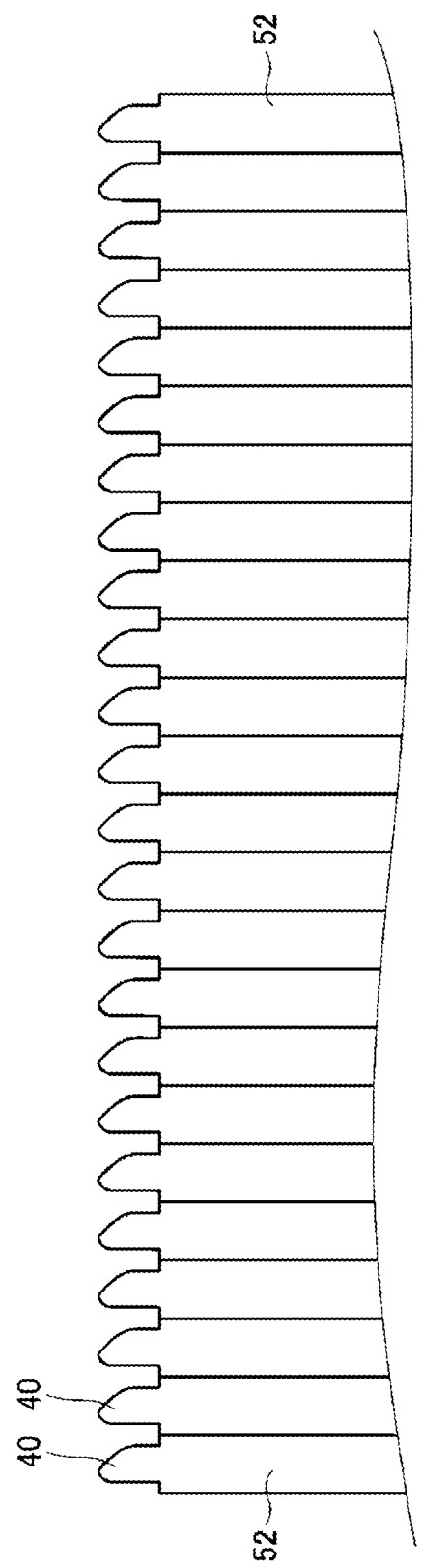
FIG. 14 is a top view of coil pieces in alignment with each other.
Figure 15:
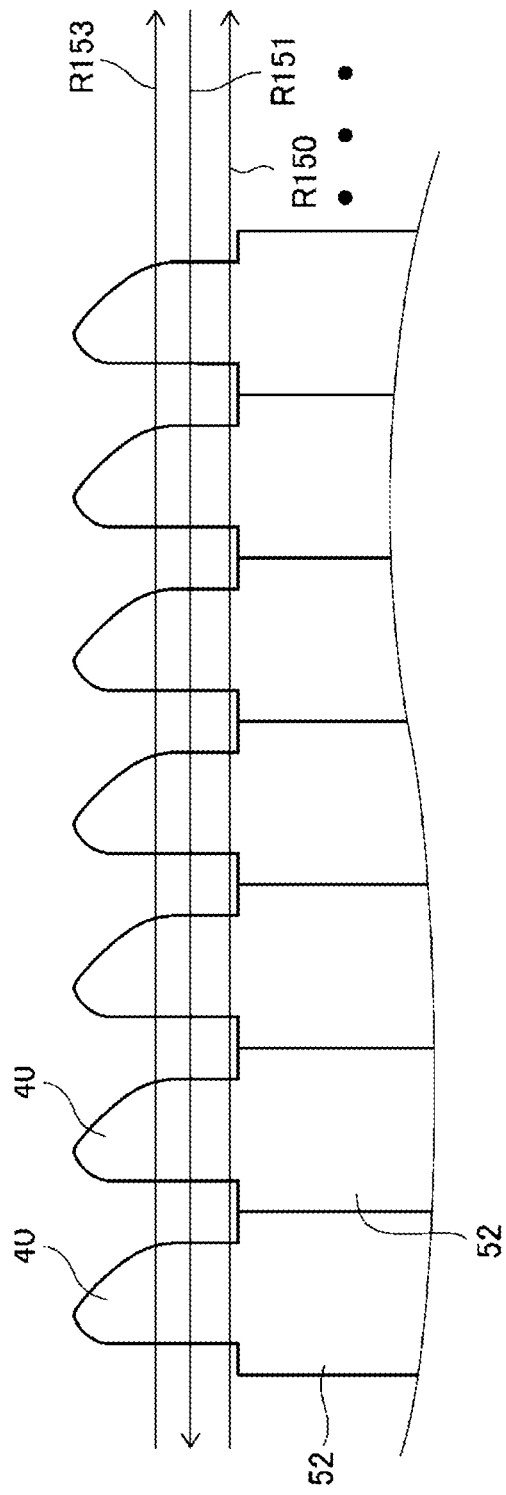
FIG. 15 is a diagram describing a coating removing laser scanning method.
Figure 16:
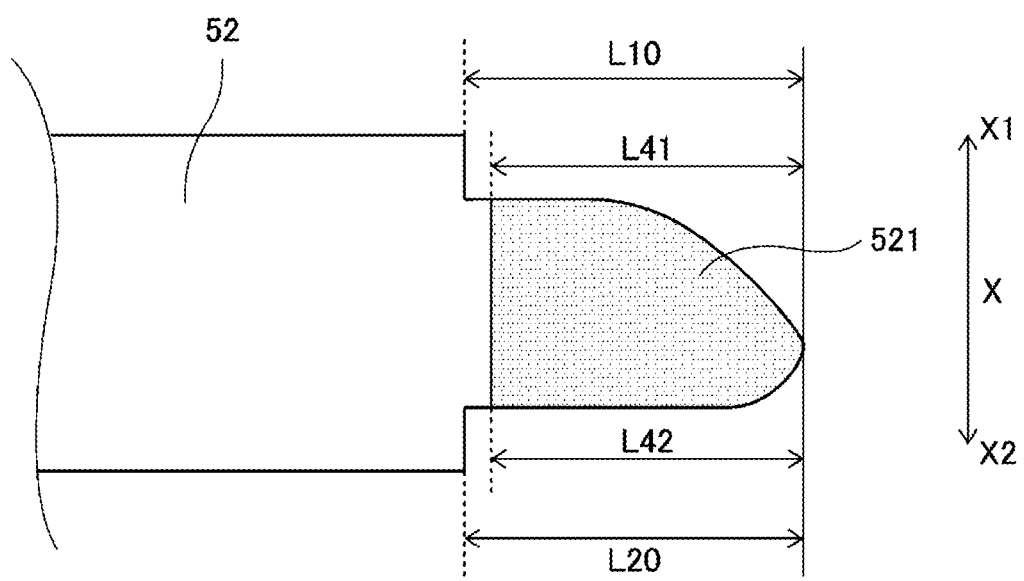
FIG. 16 is a diagram describing a coating removing laser application range in Embodiment 1.

FIG. 12 is a flow chart schematically illustrating how the coating removing step (S14 in FIG. 9), which has been mentioned above, is to be performed. FIG. 13 is a top view schematically describing how the coating removing step is to be performed. FIG. 14 is a top view of the coil pieces 52 in alignment with each other. FIG. 15 is a diagram describing a coating removing laser scanning method. FIG. 16 is a diagram describing the coating removing laser application range in the present embodiment.

First, the coating removing step includes an aligning step (S141) involving, after the cutting step (S123), aligning the straight coil pieces 52 before being shaped, with portions of the insulating coating 62 not removed from the extremities 40 (i.e., with portions of the insulating coating 62 not removed from the Y1 side and Y2 side surfaces of the extremities 40). In this step, the coil pieces 52 are brought into alignment with each other such that the extremities 40 of the coil pieces 52 are adjacent to each other as schematically illustrated in FIGS. 13 and 14. As schematically illustrated in FIG. 14, the coil pieces 52 are brought into alignment with each other such that the extremities 40 of the coil pieces 52 are located at the same position in the lengthwise direction and in abutment with each other in the widthwise direction. In one variation, the coil pieces 52 may be brought into alignment with each other such that the extremities 40 of the coil pieces 52 are located at the same position in the lengthwise direction and slightly away from each other in the widthwise direction of the coil pieces 52. Such alignment may be performed by any method. In an aligned state 133 schematically illustrated in FIG. 13, for example, positioning in the respective directions is performed using suitable jigs 1300, 1302, and 1304. In FIG. 13, the jigs 1300 are jigs for restraining the aligned coil pieces 52 in an up-down direction (which corresponds to the Y direction), the jigs 1302 are jigs for restraining the aligned coil pieces 52 in the widthwise direction, and the jig 1304 is a jig for restraining the aligned coil pieces 52 in the lengthwise direction.

As schematically illustrated in FIG. 14, the aligning step involves bringing the coil pieces 52 into alignment with each other such that the C shapes of the extremities 40 are identical in orientation. In one variation, the C shapes of the extremities 40 may be random in orientation, or the C shapes of every two extremities 40 may face each other.

The coating removing step further includes a delivering-in step (S142) involving delivering the aligned coil pieces 52, which are in the form of work, into a station 134 (which is an exemplary laser separator) as indicated by the arrows R130 in FIG. 13. The right portion of FIG. 13 schematically illustrates the state of the work after being delivered into the station 134. In the example illustrated in FIG. 13, the station 134 includes a laser oscillator 71, laser scanners (or laser heads) 72A and 72B, and a reversing jig 1310. The laser scanner 72A is provided for the extremities 40 of the aligned coil pieces 52 located on a first side in the lengthwise direction. The laser scanner 72B is provided for the extremities 40 of the aligned coil pieces 52 located on a second side in the lengthwise direction. The laser scanners 72A and 72B receive laser beams (seed light) from the laser oscillator 71. The laser scanners 72A and 72B produce coating removing laser in accordance with the laser beams received.

In one variation, the aligning step described above may be performed after the work is delivered into the station 134.

The coating removing step further includes an applying step (S143) involving applying the coating removing laser to first side surfaces (e.g., the Y1 side surfaces) of the extremities 40 of the aligned coil pieces 52. The applying step (S143) may hereinafter be referred to as a "first applying step" for the sake of distinction. By way of example, the present embodiment involves applying the coating removing laser from the laser scanners 72A and 72B to the first side surfaces of the extremities 40 on both sides in the lengthwise direction of the aligned coil pieces 52 as illustrated in the right portion of FIG. 13. The laser scanners 72A and 72B may apply the coating removing laser at the same time or at different times. In one variation, either one of the laser scanners 72A and 72B may be used. In this case, the work may be rotated by a rotating mechanism (not illustrated) while being kept aligned, and the coating removing laser may be sequentially applied to the first side surfaces of the extremities 40 for each side in the lengthwise direction of the aligned coil pieces 52. Alternatively, the laser scanner itself may in this case be moved between a position where the laser scanner applies the coating removing laser to the first side in the lengthwise direction and a position where the laser scanner applies the coating removing laser to the second side in the lengthwise direction.

Applying the coating removing laser to the first side surfaces of the extremities 40 by the first applying step removes portions of the insulating coating 62 on the first side surfaces of the extremities 40. Specifically, applying the coating removing laser to the first side surfaces of the extremities 40 carbonizes the portions of the insulating coating 62 on the first side surfaces of the extremities 40 by heat. This reduces the intimate contact between the carbonized portion and the linear conductor 60, resulting in separation of the carbonized portion from the linear conductor 60.

The first applying step involves continuously applying the coating removing laser from each laser scanner to the first side surfaces of the extremities 40 of the aligned coil pieces 52. Specifically, as illustrated in FIG. 15, scanning is performed in such a manner that the position to which the coating removing laser is applied from each laser scanner reciprocates over an entirety of a piece of work in the widthwise direction of the coil pieces 52. The insulating coating 62 (i.e., portions of the insulating coating 62 on the first side surfaces of the extremities 40) is thus removable from the extremities 40 of the coil pieces 52 more efficiently than when the coating removing laser is applied to the extremities 40 of the coil pieces 52 individually (or on a one-by-one basis).

FIG. 15 illustrates: arrows 150 and 153 schematically indicating scanning that involves moving the coating removing laser application position from the first widthwise side of the coil pieces 52 to the second widthwise side of the coil pieces 52; and an arrow 152 schematically indicating scanning that involves moving the coating removing laser application position from the second widthwise side to the first widthwise side. Scanning indicated by the arrows 150 to 153 is part of entire scanning to be performed on the work. For the extremities 40 on the first side in the lengthwise direction, the application position is reciprocated in the above-described manner while being shifted in the lengthwise direction. This makes it possible to continuously apply the coating removing laser to an entirety of a desired application range (see a hatched area 521 in FIG. 16) for the extremities 40 on the first side in the lengthwise direction. The same goes for the extremities 40 on the second side in the lengthwise direction. The number of reciprocating motions (or the number of times scanning is to be performed in the widthwise direction) may be appropriately set in accordance with, for example, the diameter (or beam diameter) of the coating removing laser such that the coating removing laser is applied to the entirety of the desired application range (see the hatched area 521 in FIG. 16). In the present embodiment, the application range is indicated by the hatched area 521 as illustrated in FIG. 16. For the X1 side lateral face, the application range extends over a distance L41 (which is one exemplary predetermined distance) from the tip of each coil piece 52. For the X2 side lateral face, the application range extends over a distance L42 (which is another exemplary predetermined distance) from the tip of each coil piece 52. By way of example, the distance L41 and the distance L42 are equal to each other in the present embodiment. Alternatively, the distance L41 and the distance L42 may be different from each other. In this case, the direction of coating removing laser scanning may be inclined with respect to the X direction.

Instead of making reciprocating motions, only scanning from the first widthwise side to the second widthwise side may be performed continuously (or only scanning from the second widthwise side to the first widthwise side may be performed continuously). In this case, the application of the coating removing laser to a piece of work will be stopped after scanning from the first widthwise side to the second widthwise side. Such an application mode is preferably used when the coating removing laser is produced by, for example, pulse oscillation. Also in the case of making reciprocating motions, the application of the coating removing laser may be stopped on the second widthwise side or the first widthwise side. Such an application mode is similarly preferably used when the coating removing laser is produced by, for example, pulse oscillation. In the case of making reciprocating motions, the application of the coating removing laser may be performed continuously without being stopped such that the coating removing laser is applied to the entire application range.

The coating removing step further includes the step (S144) of reversing the work kept in an aligned state. To be more specific, the aligned coil pieces 52 are reversed such that the first side surfaces (e.g., the Y1 side surfaces) and the second side surfaces (e.g., the Y2 side surfaces) are inverted in the Y direction while the coil pieces 52 are kept in alignment with each other. Such reversing may be carried out by any method. In the example schematically illustrated in the right portion of FIG. 13, for example, the work is reversed using the reversing jig 1310 (see the arrow R133). In this case, the reversing jig 1310 allows the work to be rotated by about 180 degrees around a rotation axis parallel to the lengthwise direction of the coil pieces 52.

Performing the reversing step in this manner makes a transition from the state in which the first side surfaces of the extremities 40 of the aligned coil pieces 52 face toward the laser scanners 72A and 72B to the state in which the second side surfaces of the extremities 40 of the aligned coil pieces 52 face toward the laser scanners 72A and 72B. In one variation, the laser scanners 72A and 72B may be rotated instead of reversing the work.

The coating removing step further includes an applying step (S145) involving applying the coating removing laser to the second side surfaces (e.g., the Y2 side surfaces) of the extremities 40 of the aligned coil pieces 52. The applying step (S145) may hereinafter be referred to as a "second applying step" for the sake of distinction. The second applying step may be similar to the first applying step described above, except that the surfaces to which the coating removing laser is to be applied are different. Accordingly, the application range in the second applying step extends over the distance L41 (which is one exemplary predetermined distance) from the tip of each coil piece 52 for the X1 side lateral face, and extends over the distance L42 (which is another exemplary predetermined distance) from the tip of each coil piece 52 for the X2 side lateral face.

Applying the coating removing laser to the second side surfaces of the extremities 40 by the second applying step removes portions of the insulating coating 62 on the second side surfaces of the extremities 40. Specifically, applying the coating removing laser to the second side surfaces of the extremities 40 carbonizes the portions of the insulating coating 62 on the second side surfaces of the extremities 40 by heat. This reduces the intimate contact between the carbonized portion and the linear conductor 60, resulting in separation of the carbonized portion from the linear conductor 60.

The coating removing step further includes a delivering-out step (S146) involving delivering the work out of the station 134. The work, which has been delivered out of the station 134, may then be delivered to the next step (see S16 in FIG. 9).

As described above, the coating removing step according to the present embodiment involves continuously applying the coating removing laser to the extremities 40 of the coil pieces 52 in alignment with each other. The coating removing step according to the present embodiment is thus able to remove the insulating coating 62 more efficiently than when the coating removing laser is applied to the extremities 40 of the coil pieces 52 on an individual basis.

When the aligning step involves bringing the coil pieces 52 into alignment with each other such that portions of the coil pieces 52 other than the extremities 40 thereof come into contact with each other, the present embodiment is able to minimize the coating removing laser scanning range in the applying steps. Consequently, the present embodiment is able to efficiently increase the number of coil pieces 52 coverable by each of the laser scanners 72A and 72B.

Including the step of reversing the work kept in the aligned state makes it possible to apply the coating removing laser to both of the first side and second side surfaces of the coil pieces 52 so as to remove the insulating coating 62 at the single station 134. The present embodiment is thus able to make facilities more efficient than when the facilities are equipped with different stations. In one variation, the application of the coating removing laser to the first side surfaces of the coil pieces 52 and the application of the coating removing laser to the second side surfaces of the coil pieces 52 may be performed at different stations.

As schematically illustrated in FIG. 14, the aligning step involves bringing the coil pieces 52 into alignment with each other such that the C shapes of the extremities 40 are identical in orientation. Thus, different pieces of work will be more uniform in the way the laser is applied to the extremities 40 of the coil pieces 52 and variations in coating removal (or separation) will be smaller than when the coil pieces 52 are brought into alignment with each other such that the C shapes are different in orientation.

Figure 17:
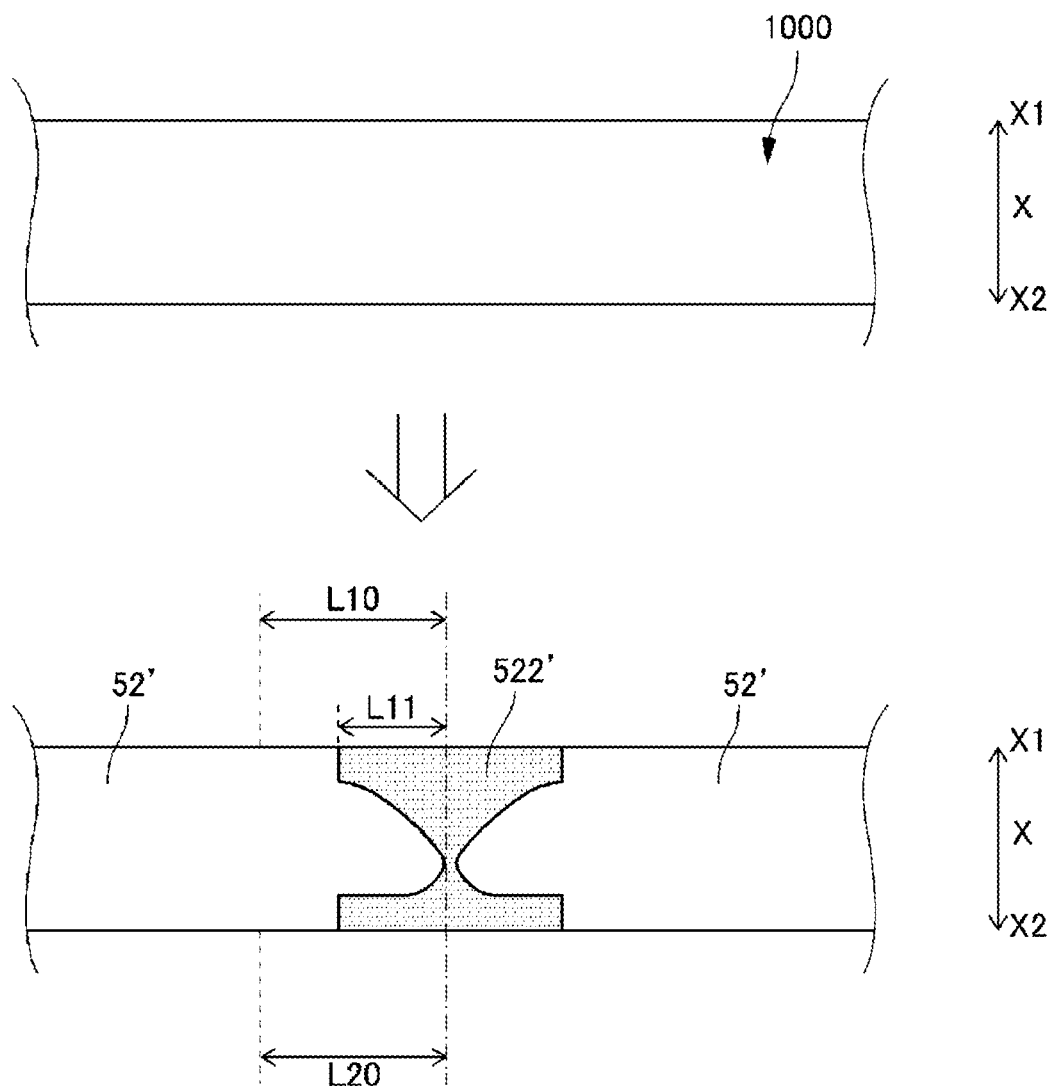
FIG. 17 illustrates diagrams describing a cutting step (S123 in FIG. 10) in Embodiment 2.
Figure 18:
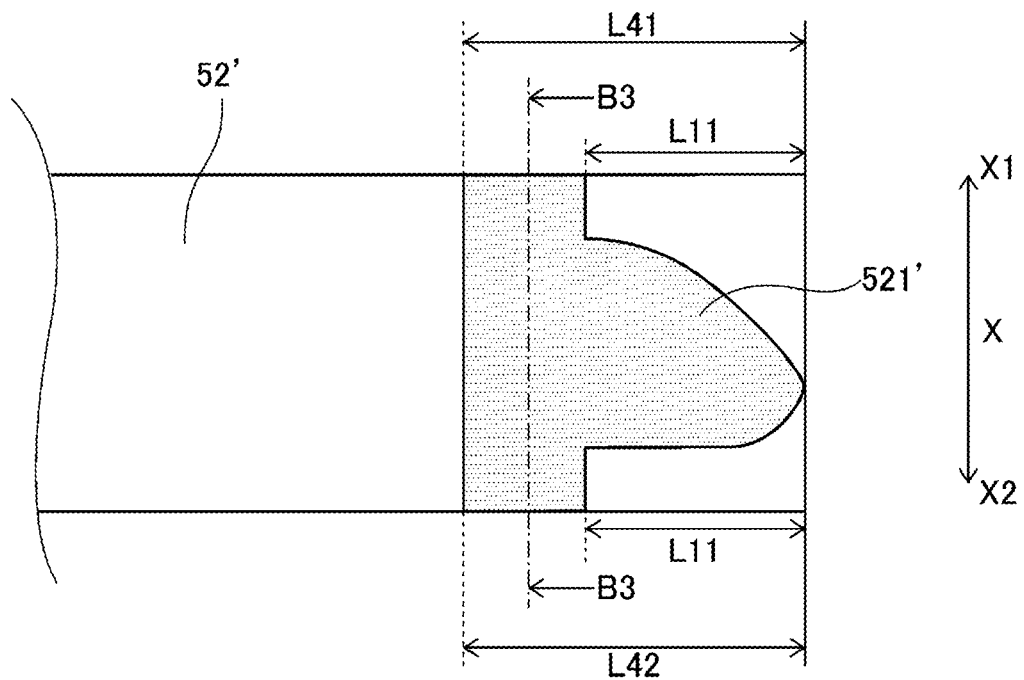
FIG. 18 is a diagram describing a coating removing laser application range in Embodiment 2.

Referring now to FIGS. 17 and 18, the following description discusses an alternative embodiment that may be carried out instead of the above-described embodiment as well as further effects achieved by the above-described embodiment. The above-described embodiment may hereinafter be referred to as "Embodiment 1" for the sake of distinction. The alternative embodiment may hereinafter be referred to as "Embodiment 2" for the sake of distinction.

FIGS. 17 and 18 are diagrams describing Embodiment 2. FIG. 17 illustrates diagrams describing a cutting step (S123) in Embodiment 2. FIG. 17 schematically illustrates how two coil pieces 52' are made out of a single coil material 1000. The upper diagram of FIG. 17 illustrates a state before the cutting step. The lower diagram of FIG. 17 illustrates a state after the cutting step. FIG. 18 is a diagram describing a coating removing laser application range in Embodiment 2.

Embodiment 2 differs from Embodiment 1 described above in the range of cutting in the cutting step (S123). Specifically, as illustrated in FIG. 11A, providing the extremities 40 in Embodiment 1 described above involves: removing, from the X1 side lateral faces, portions of the insulating coating 62 extending over the first distance L10 from the tips of the coil pieces 52; and removing, from the X2 side lateral faces, portions of the insulating coating 62 extending over the second distance L20 from the tips of the coil pieces 52. With respect to this, as illustrated in FIG. 17, providing the extremities 40 in Embodiment 2 involves: removing, from the X1 side lateral faces, portions of the insulating coating 62 extending over the distance L11 from the tips of the coil pieces 52; and removing, from the X2 side lateral faces, portions of the insulating coating 62 extending over the distance L11 from the tips of the coil pieces 52. As previously mentioned, the distance L11 is a distance between the tip of each coil piece 52 and the starting position (or X1 side starting position) of each C shape. In FIG. 17, portions of the coil material 1000 to be removed in the cutting step are indicated by a hatched area 522'.

As indicated by a hatched area 521' in FIG. 18, Embodiment 2 described thus far is similar to Embodiment 1 in that the application range extends over the distance L41 (which is one exemplary predetermined distance) from the tip of each coil piece 52 for the X1 side lateral face, and extends over the distance L42 (which is another exemplary predetermined distance) from the tip of each coil piece 52 for the X2 side lateral face.

Embodiment 2 involves performing a coating removing step similar to that performed in Embodiment 1 described above, thus achieving effects substantially similar to those achieved by Embodiment 1 described above.

The following description discusses effects of Embodiment 1 described above, which are more advantageous than those of Embodiment 2, with reference to FIGS. 11A, 11B, and 16 as well as FIGS. 17 and 18.

The coating removing step performed in Embodiment 1 described above includes: the first applying step involving applying the coating removing laser to the first side surfaces of the extremities 40, which carbonizes the portions of the insulating coating 62 on the first side surfaces of the extremities 40 within the application range; and the second applying step involving applying the coating removing laser to the second side surfaces of the extremities 40, which carbonizes the portions of the insulating coating 62 on the second side surfaces of the extremities 40 within the application range.

Performing this coating removing step in Embodiment 2 on an as-is basis unfortunately makes it difficult for the carbonized insulating coating 62 to be separated in a region of the application range, which extends beyond the distance L11 from the tip of each coil piece 52. This is because in a cross section of the region extending beyond the distance L11 from the tip of each coil piece 52, which is taken along the line B3-B3 in FIG. 18, portions of the insulating coating 62 on the first side and second side surfaces of each extremity 40 are continuous with portions of the insulating coating 62 on the lateral faces of the linear conductor 60 as in the upper cross section of FIG. 11A. In other words, in the region extending beyond the distance L11 from the tip of each coil piece 52, the insulating coating 62 has a closed cross-sectional shape, which tends to make it difficult for the insulating coating 62 to be separated if the insulating coating 62 is carbonized.

Accordingly, performing this coating removing step in Embodiment 2 makes it necessary to additionally remove the portions of the insulating coating 62 on the lateral faces of the linear conductor 60 in advance in the region of the application range, which extends beyond the distance L11 from the tip of each coil piece 52.

By contrast, in Embodiment 1 described above, portions of the insulating coating 62 on the first side and second side surfaces within the application range are disconnected from the other portions of the insulating coating 62 on both sides in the widthwise direction as illustrated in the lower diagram of FIG. 11B. As illustrated in FIG. 16, the application range in Embodiment 1 extends over the distance L41 from the tip of each coil piece 52 for the X1 side lateral face, and extends over the distance L42 from the tip of each coil piece 52 for the X2 side lateral face; however, Embodiment 1 involves removing a portion of the insulating coating 62 extending over the first distance L10 from the tip of each coil piece 52, and removing, from the X2 side lateral face, a portion of the insulating coating 62 extending over the second distance L20 from the tip of each coil piece 52. The distance L41 is equal to or shorter than the first distance L10. The distance L42 is equal to or shorter than the second distance L20. Accordingly, Embodiment 1 described above makes it substantially unnecessary to additionally remove the portions of the insulating coating 62 on the lateral faces of the linear conductor 60 in advance, thus making the step more efficient.

Although each embodiment has been described in detail thus far, the present disclosure is not limited to any particular embodiment. Various modifications and changes may be made within the scope of the claims. All or a plurality of constituent elements in the foregoing embodiments may be combined.

In one example, Embodiment 1 described above may involve the step of performing a preliminary process, such as notching portions of the insulating coating 62, before the first applying step and/or the second applying step such that separation of the insulating coating 62 is promoted during the first applying step and/or the second applying step. The same goes for Embodiment 2.

Embodiment 1 described above includes the first applying step and the second applying step so as to remove the insulating coating 62 on both Y-direction surfaces of the extremities 40 of the coil pieces 52. Alternatively, either the first applying step or the second applying step may be performed. In this case, the coating removing step may remove only a portion of the insulating coating 62 on a surface which is included in both Y-direction surfaces of each extremity 40 and which will define the abutment plane 401 (see FIG. 8). The same goes for Embodiment 2.

In Embodiment 1 described above, the coating removing laser application position is changed in a linear pattern. The coating removing laser application position does not necessarily have to be changed in this pattern. In one example, the coating removing laser application position may be changed in any other pattern, such as a spiral pattern. The same goes for Embodiment 2.

DESCRIPTION OF THE REFERENCE NUMERALS

1 motor (rotary electric machine)
24 stator coil
52 coil piece
40 extremity
60 linear conductor
62 insulating coating (insulating film)
134 station (laser separator)

The invention claimed is:

1. A conductor wire insulating film separating method comprising:
   a preparing step involving preparing rectangular cross-section coil pieces each of which is a conductor wire coated with an insulating film and used to provide a stator coil of a rotary electric machine;
   a delivering-in step involving, after the preparing step, delivering the coil pieces into a laser separator, with the coil pieces in alignment with each other such that extremities of the coil pieces are adjacent to each other;
   an applying step involving, after the delivering-in step, continuously applying film removing laser to the extremities of the aligned coil pieces such that the film removing laser is applied to one extremity and then to another extremity, thus removing at least portions of the insulating film from the extremities of the coil pieces; and
   a delivering-out step involving delivering the coil pieces, from which the at least portions of the insulating film have been removed by the applying step, out of the laser separator.

2. The conductor wire insulating film separating method according to claim 1, the method further comprising an aligning step involving, before the delivering-in step, bringing the coil pieces into alignment with each other such that the extremities of the coil pieces are adjacent to each other, wherein
   the aligning step involves bringing the coil pieces into alignment with each other such that portions of the coil pieces other than the extremities thereof come into contact with each other.

3. The conductor wire insulating film separating method according to claim 2, wherein
   portions of the insulating film on lateral faces of the extremities extending in a thickness direction of the coil pieces are removed from the extremities of the coil pieces prepared in the preparing step,
   the applying step includes
      a first applying step involving continuously applying the film removing laser to first side surfaces of the extremities of the aligned coil pieces, and
      a second applying step involving continuously applying the film removing laser to second side surfaces of the extremities of the aligned coil pieces, and
   the method further comprises a reversing step to be performed between the first applying step and the second applying step, the reversing step involving reversing the aligned coil pieces such that the first side surfaces and the second side surfaces are inverted while the coil pieces are kept in alignment with each other.

4. The conductor wire insulating film separating method according claim 3, wherein
   portions of the insulating film extending over a first distance from tips of the coil pieces are removed from first widthwise lateral faces of the extremities of the coil pieces prepared in the preparing step, and portions of the insulating film extending over a second distance from the tips of the coil pieces are removed from second widthwise lateral faces of the extremities of the coil pieces prepared in the preparing step, the applying step involves applying the film removing laser to an application range extending over a predetermined distance from the tip of each of the coil pieces, and the predetermined distance is equal to or shorter than the first distance on a first widthwise side, and is equal to or shorter than the second distance on a second widthwise side.

5. The conductor wire insulating film separating method according to claim 4, wherein as viewed in a direction perpendicular to both of a lengthwise direction and a widthwise direction of the coil pieces, conductor portions of the extremities of the coil pieces prepared in the preparing step have C shapes asymmetric with respect to widthwise centers of the coil pieces, and the aligned coil pieces are in alignment with each other such that the C shapes are identical in orientation.

6. The conductor wire insulating film separating method according to claim 5, wherein the preparing step includes a cutting step involving cutting a coil material with a press so as to provide the coil pieces including the C-shaped extremities, and during cutting of the coil material with the press, the cutting step involves simultaneously removing, from the first widthwise lateral faces, the portions of the insulating film extending over the first distance and removing, from the second widthwise lateral faces, the portions of the insulating film extending over the second distance.

7. The conductor wire insulating film separating method according to claim 1, wherein portions of the insulating film on lateral faces of the extremities extending in a thickness direction of the coil pieces are removed from the extremities of the coil pieces prepared in the preparing step, the applying step includes a first applying step involving continuously applying the film removing laser to first side surfaces of the extremities of the aligned coil pieces, and a second applying step involving continuously applying the film removing laser to second side surfaces of the extremities of the aligned coil pieces, and the method further comprises a reversing step to be performed between the first applying step and the second applying step, the reversing step involving reversing the aligned coil pieces such that the first side surfaces and the second side surfaces are inverted while the coil pieces are kept in alignment with each other.

8. The conductor wire insulating film separating method according to claim 7, wherein portions of the insulating film extending over a first distance from tips of the coil pieces are removed from first widthwise lateral faces of the extremities of the coil pieces prepared in the preparing step, and portions of the insulating film extending over a second distance from the tips of the coil pieces are removed from second widthwise lateral faces of the extremities of the coil pieces prepared in the preparing step, the applying step involves applying the film removing laser to an application range extending over a predetermined distance from the tip of each of the coil pieces, and the predetermined distance is equal to or shorter than the first distance on a first widthwise side, and is equal to or shorter than the second distance on a second widthwise side.

9. The conductor wire insulating film separating method according to claim 8, wherein as viewed in a direction perpendicular to both of a lengthwise direction and a widthwise direction of the coil pieces, conductor portions of the extremities of the coil pieces prepared in the preparing step have C shapes asymmetric with respect to widthwise centers of the coil pieces, and the aligned coil pieces are in alignment with each other such that the C shapes are identical in orientation.

10. The conductor wire insulating film separating method according to claim 9, wherein the preparing step includes a cutting step involving cutting a coil material with a press so as to provide the coil pieces including the C-shaped extremities, and during cutting of the coil material with the press, the cutting step involves simultaneously removing, from the first widthwise lateral faces, the portions of the insulating film extending over the first distance and removing, from the second widthwise lateral faces, the portions of the insulating film extending over the second distance.

11. The conductor wire insulating film separating method according to claim 1, wherein portions of the insulating film extending over a first distance from tips of the coil pieces are removed from first widthwise lateral faces of the extremities of the coil pieces prepared in the preparing step, and portions of the insulating film extending over a second distance from the tips of the coil pieces are removed from second widthwise lateral faces of the extremities of the coil pieces prepared in the preparing step, the applying step involves applying the film removing laser to an application range extending over a predetermined distance from the tip of each of the coil pieces, and the predetermined distance is equal to or shorter than the first distance on a first widthwise side, and is equal to or shorter than the second distance on a second widthwise side.

12. The conductor wire insulating film separating method according to claim 11, wherein as viewed in a direction perpendicular to both of a lengthwise direction and a widthwise direction of the coil pieces, conductor portions of the extremities of the coil pieces prepared in the preparing step have C shapes asymmetric with respect to widthwise centers of the coil pieces, and the aligned coil pieces are in alignment with each other such that the C shapes are identical in orientation.

13. The conductor wire insulating film separating method according to claim 12, wherein the preparing step includes a cutting step involving cutting a coil material with a press so as to provide the coil pieces including the C-shaped extremities, and during cutting of the coil material with the press, the cutting step involves simultaneously removing, from the first widthwise lateral faces, the portions of the insulating film extending over the first distance and removing, from the second widthwise lateral faces, the portions of the insulating film extending over the second distance.

14. The conductor wire insulating film separating method according to claim 1, the method further comprising a welding step to be performed after the delivering-out step, the welding step involving welding the extremity of each of the coil pieces to the extremity of another one of the coil pieces.

15. The conductor wire insulating film separating method according to claim 1, wherein the applying step involves continuously applying the film removing laser from a laser scanner to the extremities of the aligned coil pieces.

16. The conductor wire insulating film separating method according to claim 2, wherein
   portions of the insulating film extending over a first distance from tips of the coil pieces are removed from first widthwise lateral faces of the extremities of the coil pieces prepared in the preparing step, and portions of the insulating film extending over a second distance from the tips of the coil pieces are removed from second widthwise lateral faces of the extremities of the coil pieces prepared in the preparing step,
   the applying step involves applying the film removing laser to an application range extending over a predetermined distance from the tip of each of the coil pieces, and
   the predetermined distance is equal to or shorter than the first distance on a first widthwise side, and is equal to or shorter than the second distance on a second widthwise side.

17. The conductor wire insulating film separating method according to claim 16, wherein
   as viewed in a direction perpendicular to both of a lengthwise direction and a widthwise direction of the coil pieces, conductor portions of the extremities of the coil pieces prepared in the preparing step have C shapes asymmetric with respect to widthwise centers of the coil pieces, and
   the aligned coil pieces are in alignment with each other such that the C shapes are identical in orientation.

18. The conductor wire insulating film separating method according to claim 17, wherein
   the preparing step includes a cutting step involving cutting a coil material with a press so as to provide the coil pieces including the C-shaped extremities, and
   during cutting of the coil material with the press, the cutting step involves simultaneously removing, from the first widthwise lateral faces, the portions of the insulating film extending over the first distance and removing, from the second widthwise lateral faces, the portions of the insulating film extending over the second distance.

* * * * *